United States Patent
Gerphagnon et al.

(10) Patent No.: US 9,880,887 B2
(45) Date of Patent: Jan. 30, 2018

(54) METHOD, COMPUTER PROGRAM AND DEVICE FOR ALLOCATING COMPUTER RESOURCES OF A CLUSTER FOR EXECUTING A TASK SUBMITTED TO SAID CLUSTER

(71) Applicant: BULL SAS, Les Clayes Sous Bois (FR)

(72) Inventors: Jean-Olivier Gerphagnon, Seyssins (FR); Françoise Mille-Rey, Saint Jean de Moirans (FR); Corine Marchand, Grenoble (FR)

(73) Assignee: BULL SAS, Les Clays Sous Bois (FR)

( * ) Notice: Subject to any disclaimer, the term of this patent is extended or adjusted under 35 U.S.C. 154(b) by 0 days.

(21) Appl. No.: 14/356,874

(22) PCT Filed: Oct. 15, 2012

(86) PCT No.: PCT/FR2012/052342
§ 371 (c)(1),
(2) Date: May 7, 2014

(87) PCT Pub. No.: WO2013/068662
PCT Pub. Date: May 16, 2013

(65) Prior Publication Data
US 2014/0310718 A1    Oct. 16, 2014

(30) Foreign Application Priority Data

Nov. 8, 2011  (FR) .................... 11 60173

(51) Int. Cl.
*G06F 9/46* (2006.01)
*G06F 9/50* (2006.01)

(52) U.S. Cl.
CPC .......... *G06F 9/5094* (2013.01); *Y02B 60/142* (2013.01)

(58) Field of Classification Search
CPC ........................ G06F 9/5094; Y02B 60/142
(Continued)

(56) References Cited

U.S. PATENT DOCUMENTS 6,179,489 B1    1/2001  So et al.
7,127,625 B2 *  10/2006 Farkas ............... G06F 1/206
                                                       713/300
(Continued)

FOREIGN PATENT DOCUMENTS

EP      2 278 465 A2    1/2011
JP      S55-159428 U    11/1980
(Continued)

OTHER PUBLICATIONS

IEEE 100 The Authoritative Dictionary of IEEE Standards Terms, Seventh Edition, 2000, p. 1285.*
(Continued)

*Primary Examiner* — Qing Chen
(74) *Attorney, Agent, or Firm* — Pillsbury Winthrop Shaw Pittman LLP

(57) ABSTRACT

A method and device for allocating computer resources of a cluster for carrying out at least one job controlled by the cluster is disclosed. In one aspect, the method includes determining the placement of the job from physical features of the job and from physical features and availability of the computer resources of at least one processing area of the cluster. The method further includes receiving energy state features of the computer resources of at least the processing area; determining a recommended placement of the at least one job by correlating the physical features of the job, the physical features, availability and energy state of the computer resources on the basis of predetermined rules; and deducing, from the predetermined recommended placement, (Continued)

a recommended allocation list of the computer resources for carrying out the job in the cluster.

16 Claims, 4 Drawing Sheets

(58) Field of Classification Search
USPC .......................................................... 718/104
See application file for complete search history.

(56) References Cited

U.S. PATENT DOCUMENTS

| | | | |
|---|---|---|---|
| 7,197,433 B2* | 3/2007 | Patel | G06F 9/505 |
| | | | 702/188 |
| 7,472,237 B1 | 12/2008 | Herbst et al. | |
| 7,549,070 B2* | 6/2009 | Zwinger | G06F 1/3209 |
| | | | 340/501 |
| 7,856,549 B2* | 12/2010 | Wheeler | G06F 1/3203 |
| | | | 709/223 |
| 8,001,403 B2* | 8/2011 | Hamilton | G06F 1/3203 |
| | | | 713/300 |
| 8,086,544 B2* | 12/2011 | Boss | G06Q 10/04 |
| | | | 705/400 |
| 8,284,205 B2* | 10/2012 | Miller | G06F 1/3203 |
| | | | 345/501 |
| 8,489,745 B2* | 7/2013 | Mandagere | G06F 1/3203 |
| | | | 709/223 |
| 8,667,500 B1* | 3/2014 | Ji | G06F 9/5077 |
| | | | 718/102 |
| 9,047,083 B2* | 6/2015 | Gupta | G06F 1/3203 |
| 2005/0055590 A1* | 3/2005 | Farkas | G06F 1/206 |
| | | | 713/320 |
| 2005/0228618 A1* | 10/2005 | Patel | G06F 9/505 |
| | | | 702/188 |
| 2007/0094043 A1* | 4/2007 | Bannai | G06Q 10/06 |
| | | | 705/7.37 |
| 2008/0004837 A1* | 1/2008 | Zwinger | G06F 1/3209 |
| | | | 702/182 |
| 2008/0046500 A1* | 2/2008 | Kato | G06F 9/5044 |
| | | | 709/201 |
| 2008/0104605 A1* | 5/2008 | Steinder | G06F 9/5033 |
| | | | 718/104 |
| 2008/0123288 A1 | 5/2008 | Hillis | |
| 2008/0177424 A1* | 7/2008 | Wheeler | G06F 1/3203 |
| | | | 700/295 |
| 2009/0109230 A1* | 4/2009 | Miller | G06F 1/3203 |
| | | | 345/506 |
| 2009/0178045 A1* | 7/2009 | Gupta | G06F 9/5016 |
| | | | 718/103 |
| 2009/0235097 A1* | 9/2009 | Hamilton | G06F 1/3203 |
| | | | 713/320 |
| 2009/0276649 A1* | 11/2009 | Hamilton, II | G06F 1/3203 |
| | | | 713/320 |
| 2010/0057641 A1* | 3/2010 | Boss | G06Q 10/04 |
| | | | 705/412 |
| 2010/0070784 A1* | 3/2010 | Gupta | G06F 1/3203 |
| | | | 713/310 |
| 2010/0211669 A1* | 8/2010 | Dalgas | G06F 9/5027 |
| | | | 709/224 |
| 2010/0257533 A1* | 10/2010 | Dvir | G06F 11/0715 |
| | | | 718/103 |
| 2011/0010456 A1 | 1/2011 | Saeki | |
| 2011/0078679 A1* | 3/2011 | Bozek | G06F 9/455 |
| | | | 718/1 |
| 2011/0173617 A1* | 7/2011 | Gargash | G06F 1/3203 |
| | | | 718/100 |
| 2011/0213508 A1 | 9/2011 | Mandagere et al. | |
| 2012/0278812 A1* | 11/2012 | Wang | G06F 9/505 |
| | | | 718/104 |
| 2014/0068056 A1* | 3/2014 | Simitsis | G06F 9/5011 |
| | | | 709/224 |

FOREIGN PATENT DOCUMENTS

| | | |
|---|---|---|
| JP | S57-94997 U | 6/1982 |
| JP | H01-175800 A | 7/1989 |
| JP | H03-23237 U | 3/1991 |
| JP | 2001-074098 A | 3/2001 |

OTHER PUBLICATIONS

WIPO/PCT—International Search Report, dated Jun. 12, 2012, for Publication No. WO 2013/068662 A1.
Muir, ., et al., "AsyMOS—An Asymmetric Multiprocessor Operating System," IEEE, 1998, pp. 25-34.
Foong, A., et al., "An Architecture for Software-based iSCSI on Multiprocessor Servers," Proceedings of the 19th IEEE International Parallel and Distributed Processing Symposium (IPDPS'05), 2005, pp. 1-7.
Japanese Office Action as issued in Japanese Patent Application No. 2015-010935, dated Mar. 8, 2016.

* cited by examiner

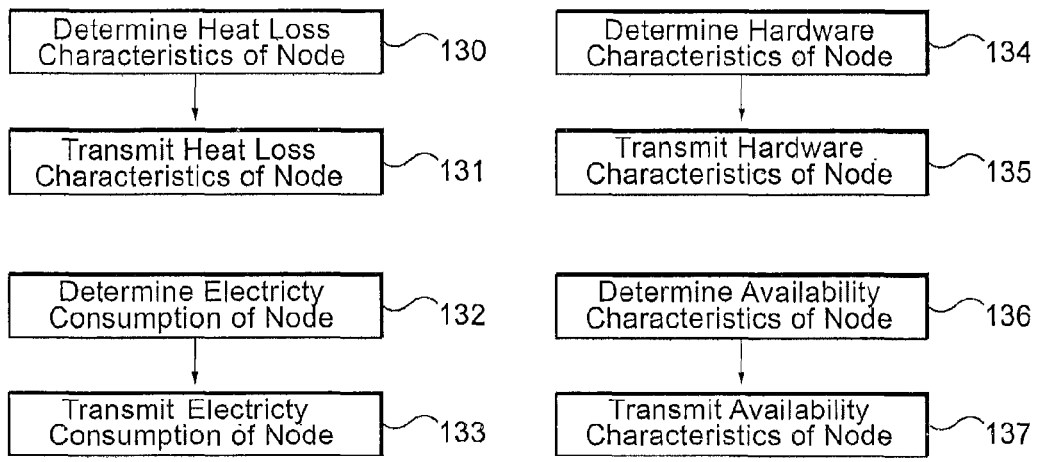
Fig. 7
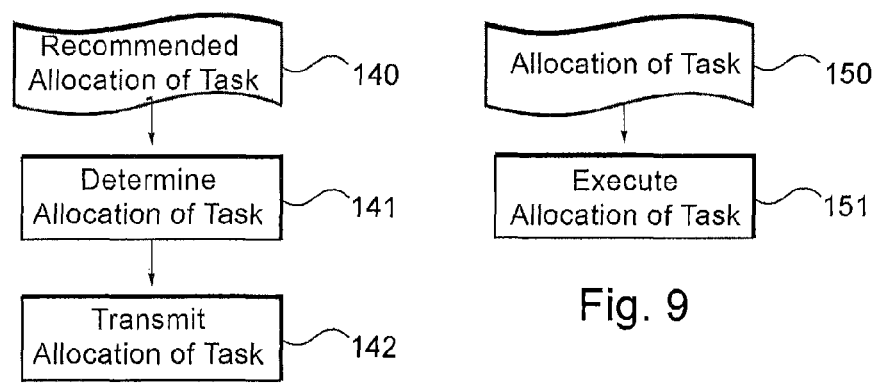
Fig. 9
Fig. 8

METHOD, COMPUTER PROGRAM AND DEVICE FOR ALLOCATING COMPUTER RESOURCES OF A CLUSTER FOR EXECUTING A TASK SUBMITTED TO SAID CLUSTER

CROSS-REFERENCE TO RELATED APPLICATIONS

This application is a National Stage application of and claims benefit of priority to International Application No. PCT/FR2012/052342, filed on Oct. 15, 2012, which claims benefit of priority to French Application No. 1160173, filed on Nov. 8, 2011. The disclosure of each of the above-described applications are hereby expressly incorporated by reference in their entirety.

BACKGROUND

Field

The present application concerns the placement of tasks submitted to a cluster and more particularly a method, a computer program and a device for allocating computer resources of the cluster for the execution of tasks submitted to that cluster.

Description of the Related Technology

Clusters generally group together servers, data storage units, microprocessors and telematics equipment taking the form of racks in which items of computer equipment are installed, for example removably.

A plurality of clusters is often brought together to form data centers or server clusters.

Data centers generally bring together hundreds and sometimes thousands of electronic devices to interconnect via items of computer equipment.

These items of computer equipment are generally carried by blades inserted into the racks.

An item of computer equipment is likened here to a node, in other words a basic item of computer equipment for computation. Each node thus forms an independent computer and has characteristics specific to itself, for example, such as the number of cores it comprises as well as a predetermined memory size (each core forming a computation unit).

One or more nodes form a processing zone, also referred to as computation zone, and they correspond to computing resources of a cluster. The processing zone may in some cases be formed by only some electronic components of one node, or even, on the contrary, by a high number of nodes.

These clusters generally further comprise a control and monitoring unit provided with a task management system, also termed a task manager.

The task manager is configured to receive a certain number of tasks requested from outside the cluster.

Methods of allocating computer resources of a cluster for executing tasks submitted to that cluster are known, which have the step of receiving tasks and of placing them in a queue. When a new task is submitted, the latter is directly added to the queue, for example at the end of the queue.

To be executed, the tasks submitted require computer resources corresponding to hardware requirements, for example the number of cores needed, the size of memory needed and/or the execution priority level for that task (for example minimum, normal or maximum).

These known methods furthermore have the step of receiving information relative to the hardware characteristics of the computer resources of the cluster as well as availability characteristics of those resources. This means that the task manager receives information concerning, for example, the number of cores of each node and the predetermined size of memory of each core in order to know the hardware characteristics of the cluster or at the very least of a processing zone of that cluster. Furthermore, this means that the task manager receives the characteristics of availability of each of those nodes.

These known methods furthermore comprise the step of determining the allocation of the computer resources to the listed tasks that are queued and ready to be executed, according to the hardware characteristics of those tasks (hardware needs and priority) and according to the hardware and availability characteristics specific to the processing zone (in other words specific, for example, to each node of that zone).

The task manager next sends a task selected from the waiting list to the allocated computer resources in order for that task to be executed by the cluster.

Each new task added to the task queue is thus executed according to the criteria for available required computer resources and priority.

SUMMARY

The application concerns methods of allocating cluster computer resources for executing tasks directed to optimizing the allocation of the resources by placing the tasks more precisely and more finely than in the methods of the state of the art, in a manner that is simple, convenient and economic.

According to a first aspect, there is a method of allocating computer resources of a cluster for executing at least one task submitted to said cluster, comprising determining the placement of the at least one submitted task on the basis of hardware characteristics of the at least one task and on the basis of hardware and availability characteristics of the computer resources at least of a processing zone of the cluster, wherein determining the placement of the at least one submitted task comprises:

receiving energy state characteristics of the computer resources at least of the processing zone;

determining a recommended placement of the at least one task, through correlation between the hardware characteristics of the at least one task and the hardware, availability and energy state characteristics of the computer resources at least of the processing zone, according to predetermined rules; and deducing from the determined recommended placement a recommended allocation list of the computer resources of the processing zone for the execution of the at least one task in the cluster.

The classification of the submitted listed tasks can be carried out according to a recommended allocation list of the computer resources for the execution of the tasks that is determined prior to their execution.

This recommended allocation list of computer resources can be determined on the basis of hardware data and availability data associated with the processing zone of the cluster where the submitted listed tasks could be executed, on the basis of hardware data associated with each submitted listed task and on the basis of energy data associated with that processing zone.

The combination of these various data linked to each submitted task and to the processing zone, that is to say to at least one electronic component of at least one node of the cluster, makes it possible to take into account the energy aspect, for example, by the electricity consumption and/or the heat loss of the processing zone, in the allocation of the computer resources of that processing zone for the execution of the submitted listed tasks (which are also more simply called task placement).

The taking into account of this energy aspect within the cluster makes it possible to precisely and finely place the submitted listed tasks not only on the basis of the priority of a given task, the hardware needs of that given task as well as the availability of the computer resources of the processing zone, but also on the basis of the energy state at least of the processing zone and the energy impact of the submitted listed tasks that are ready to be executed at least on that processing zone, or even over the whole of the cluster.

The method thus gives the possibility of correlating information on the energy state at least of the processing zone, of the information on the hardware and availability state of the computer resources at least of that zone and of the hardware information associated with each of the tasks submitted listed in order to place those tasks optimally to execute them, simply, conveniently and economically.

In certain embodiments, the method gives an overview of both the energy state and of the hardware state at least of the processing zone, or even of the whole cluster, and of the hardware state of the submitted listed task, and also makes it possible to correlate that information in order to determine the energy impact on at least the processing zone, or even on the whole cluster, of the execution of the task by computer resources or the processing zone.

According to convenient and economical features of the method:

it can further comprise sending the recommended list for the execution of the at least one task by the computer resources of the processing zone;

the energy state characteristics may correspond to the heat loss and/or the electricity consumption of the computer resources of the cluster; and the method may comprise determining the heat loss characteristics at least of the computer resources of the processing zone and/or determining electricity consumption characteristics at least of the computer resources of the processing zone;

it may comprise determining the energy state characteristics of the computer resources at least of the processing zone on the basis of the heat loss characteristics and/or of the electricity consumption characteristics at least of the computer resources of the processing zone;

the predetermined rules of correlation and of placement may take into consideration the energy impact on the computer resources of the cluster of the execution of the at least one task; and determining a recommended placement of the at least one task may comprise determining the energy impact linked to the execution of the at least one task on the basis of the hardware characteristics of the at least one task and of the energy state characteristics of the computer resources of the cluster;

the hardware characteristics of the computer resources at least of the processing zone of the cluster may correspond to the number of basic computation units and/or to a memory size of the computer resources; and the method may comprise determining the hardware characteristics of the computer resources and determining the availability characteristics of the computer resources;

the hardware characteristics of the at least one task may correspond to the number of basic computation units and/or to a memory size necessary for the execution of the at least one task and/or to an execution priority of the at least one task; and the method may comprise determining a list of the hardware characteristics of the at least one task according to the number of basic computation units and/or the memory size necessary for the execution of the at least one task and/or the execution priority of the at least one task; and/or it may comprise receiving an energy profile associated with the at least one task and determining a list of the hardware characteristics of the at least one task according to the energy profile associated with the at least one task.

According to a second aspect, there is a non-transitory computer program product encoded with instructions adapted for directing a computer or processor to carry out the method as described above when the program is executed on a computer or processor.

According to a third aspect, the application also relates to a device comprising a task manager, an energy manager and a correlation system collectively configured for carrying out the method as described above.

This device makes it possible to implement each of the steps of the method as described above in a manner that is simple, convenient and economical.

According to convenient and economical features of the device the task manager and the energy manager each communicate independently with computer resources of a cluster; and the correlation system communicates both with the task manager and with the energy manager.

BRIEF DESCRIPTION OF THE DRAWINGS

The disclosure will now be continued with the description of at least an example embodiment, given below by way of illustrative and non-limiting example, with reference to the accompanying drawings, in which:

FIG. 7 is a block diagram respectively showing establishing a file of heat loss characteristics for each node forming a computer resource comprised by the at least one processing zone, establishing a file of electricity consumption characteristics for each of those nodes, establishing a hardware characteristics file for each of those nodes and establishing a file of availability characteristics for each of those nodes, for the implementation of the steps that can be seen in FIGS. 5 and 7.

FIGS. 8 and 9 are block diagrams illustrating other operating steps of the method.

DETAILED DESCRIPTION OF CERTAIN INVENTIVE EMBODIMENTS

Figure 1:
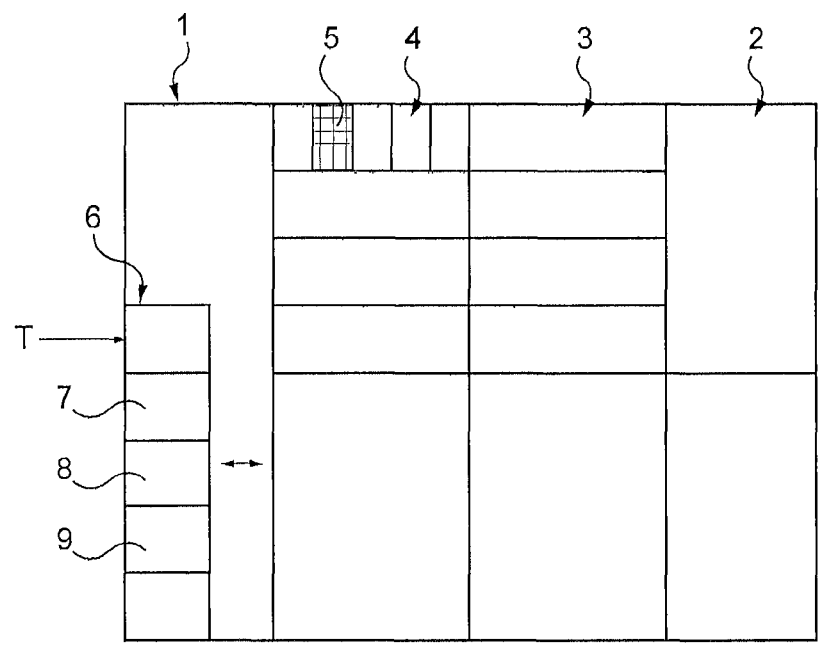
FIG. 1 is a very diagrammatic representation of a cluster provided with at least one processing zone and with a device configured for the implementation of a method of allocating computer resources of the cluster for the execution of a task submitted to that cluster.

FIG. 1 is a very diagrammatic illustration of a cluster 1 having several processing zones 2, for example six in number, as well as a general device for control and monitoring 6.

Each processing zone 2 can form a computation zone which can comprise several rows of racks 3 in which are inserted blades of computer equipment which can each be formed from a plurality of computer components.

Each processing zone 2 can have a plurality of nodes 5 corresponding to a basic computer equipment item for computation, that is to say an independent computer.

In certain embodiments, a computer equipment item can be assimilated to a node 5.

Each node 5 in the example of FIG. 1 can form a computer resource of the cluster 1.

Each node 5 may have characteristics specific to it that will be described below with reference to FIG. 3.

The general device for control and monitoring 6 can be provided with communication interfaces enabling in particular the reception of input data coming from outside the cluster 1, for example such as the reception of tasks T to execute within the cluster 1.

The general device for control and monitoring 6 can furthermore be provided with system parts 7, 8 and 9 which can be respectively formed by a task manager 7, an energy manager 8 and a correlation system 9 which communicate and interact with each other and with the nodes 5 of the cluster 1, as is described below with reference to FIG. 2.

Figure 2:
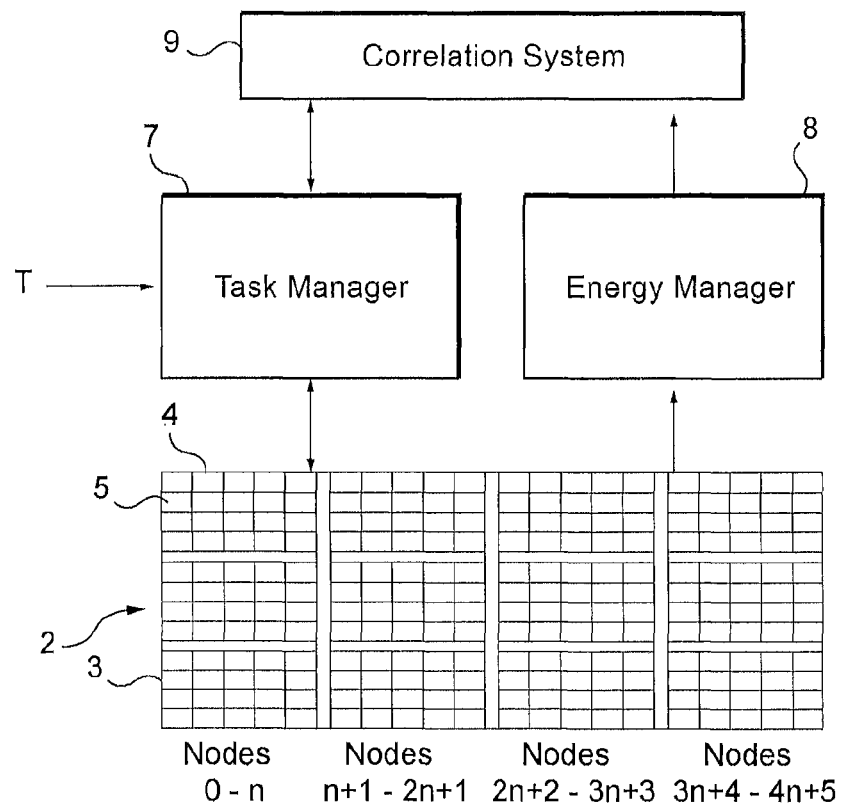
FIG. 2 is a very diagrammatic representation of an environment for communication between one or more processing zones and the device of the cluster that can be seen in FIG. 1.

FIG. 2 represents the interactive environment communicating between a processing zone 2 of the cluster 1, in particular a plurality of nodes 5 disposed in the blades 4, with the system parts which can be formed by the task manager 7, the energy manager 8 and the correlation system 9.

In certain embodiments, the processing zone 2 can be formed from four racks 3 each provided with a plurality of blades 4 disposed at three location heights which can be designated upper level, central level, and lower level with reference to FIG. 2.

Each blade 4 can be provided with a plurality of nodes 5 the number of which is predetermined here.

The first rack 3 can be provided with nodes 5 numbered from 0 to n, the second rack 3 can be provided with nodes 5 numbered from n+1 to 2n+1, the third rack 3 can be provided with nodes 5 numbered from 2n+2 to 3n+3 and the fourth rack 3 can be provided with nodes 5 numbered from 3n+4 to 4n+5.

The task manager 7 can be configured to receive input data submitted to the cluster 1, corresponding to data characteristic of a task T to execute in at least the predetermined processing zone 2 of the cluster 1.

This task manager 7 can be furthermore configured to communicate mutually both with the nodes 5 at least of the processing zone 2 of the cluster 1 and with the correlation system 9.

This means that the task manager 7 can be configured to receive information relative to the nodes 5 coming at least from the processing zone 2, to send information to those nodes 5, to receive information from the correlation system 9 and to send information to that correlation system 9.

The energy manager 8 can be configured to communicate both with the nodes 5 at least of the processing zone 2 of the cluster 1 and with the correlation system 9. The energy manager 8 can be configured to receive information relative to the nodes 5 at least from that processing zone 2 and to send information to the correlation system 9.

Thus, the correlation system 9 can be configured to communicate with the energy manager 8 in that it can be configured to receive information from that energy system 8; and to communicate mutually with the task manager 7 in that it can be configured to receive information from that task manager 7 and to send information to that task manager 7.

In certain embodiments, the processing zone 2 can be configured to send information relative to the hardware and availability characteristics of the nodes 5 (forming the computer resources) to the task manager 7 and information relative to the characteristics of the energy state of those nodes 5 to the energy manager 8.

The energy manager 8 can be configured to send a database which is informative with regard to the energy characteristics at least of the processing zone 2 of the cluster 1 to the correlation system 9.

The task manager 7 can be configured to send information relative to the hardware characteristics of each task T that is submitted to it to the correlation system 9.

The correlation system 9 can be configured to send information relative to a recommended allocation of the nodes 5 for the execution of at least one task T to the task manager 7, the latter can be furthermore configured to send information relative to the nodes 5 (that is to say to the computer resources) which, for the execution of that task T, have been chosen at least from among the nodes 5 of the predetermined processing zone 2 itself chosen for the execution of the task T.

Figure 3:
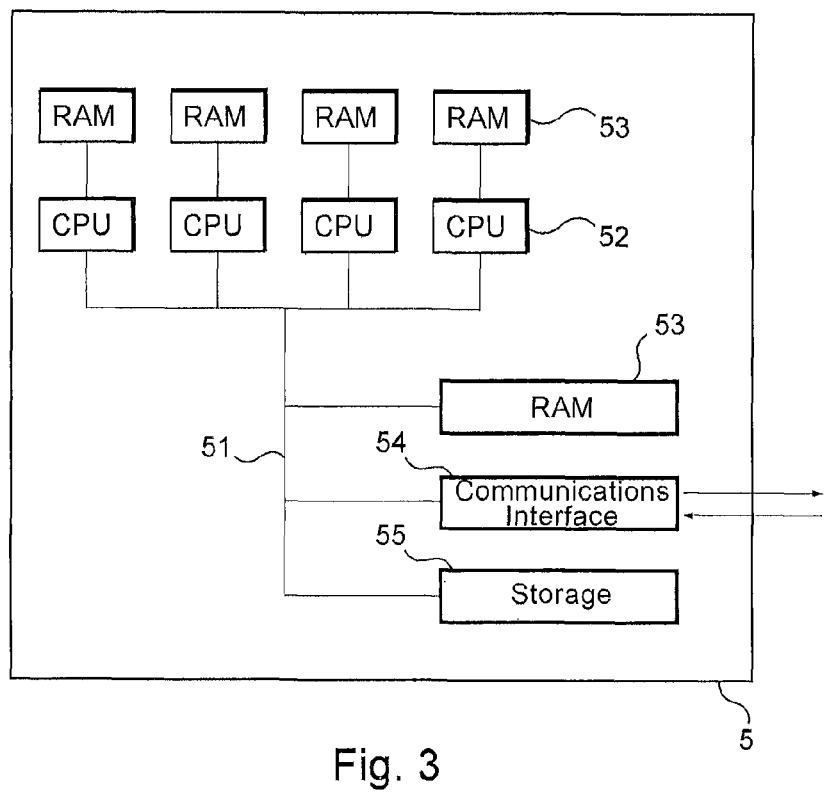
FIG. 3 is a diagram that illustrates an example architecture for at least one computer resource of the cluster illustrated in FIG. 1.

An architecture example for a node 5 of the cluster 1 is illustrated in FIG. 3.

The node 5 can comprise a communication bus 51 to which are connected Central Processing Units (CPUs) or microprocessors 52, volatile memory components 53 (Random Access Memory (RAM)), comprising registers adapted to record variables of the parameters created and modified during the execution of programs, communication interfaces 54 configured to send and receive data; and internal storage units 55, such as hard disks, which may in particular comprise the executable code for programs enabling the nodes 5 to implement a task T.

In certain embodiments, each volatile memory component 53 can be associated with a microprocessor 52 or is common to the electronic components of the node 5.

The communication bus 51 enables the communication and interoperability of the various electronic components comprised by the node 5 or which are connected to it.

The representation of the bus 51 is non-limiting, and, in particular, the microprocessors 52 are capable of communicating instructions to any electronic component of the node 5 directly or via another electronic component of the node 5.

More generally, the program or programs implemented may be loaded into one of the electronic components for storage or communication of the node 5 before being executed.

The microprocessors 52 can control and direct the execution of the instructions or portions of software code of the program or programs which may be implemented in the node 5. On powering up, the program or programs which are stored in a non-volatile memory, for example a hard disk, are transferred into the random-access memory 53 which then contains the executable code of the program or programs implemented, as well as registers for storing the variables and parameters necessary for the implementation of those programs.

Each node 5 thus can have a certain number of electronic components 52 to 55 as well as hardware characteristics specific to it.

These hardware characteristics for example correspond to the number of microprocessors 52 it comprises, to the number of cores each forming a computation unit and each having a predetermined memory size, the total volatile memory size, the hard disk memory size, the maximum frequency of use of the microprocessors 52, the total bandwidth use of the memory and of the inputs/outputs, the temperature of the node 5 or the individual temperature of an electronic component of the node 5 and the electrical power consumed by the node 5 or the individual electrical power consumed by an electronic component of the node 5.

Some of these characteristics that can be specific to the node 5 are predetermined (number of microprocessors, number of cores, total memory size, size of volatile memory, size of hard disk memory and maximum frequency of use of the microprocessors), and other characteristics are dynamic, that is to say that they vary according to the use of the node 5 and that they are determined at a given time (bandwidth use of the memory and of the inputs/outputs), temperature, electrical power consumed and frequency of use of the microprocessor).

It is noted that the characteristics specific to the node 5 that are predetermined can be however subject to change, that is to say that they may be modified for example by the elimination, the replacement and/or the addition of electronic components, or even via software means (by acting on the Basic Input Output System (BIOS).

It is noted that the architecture illustrated in FIG. 3 can correspond to that of a node 5, that is to say of a computer resource, of a processing zone 2 of the cluster 1, but that it could be a matter of being identical, or at the very least similar, to the architecture of a part of the general device for control and monitoring 6 which can be configured to implement an algorithm described below with reference to FIGS. 4 to 9.

Where applicable, the microprocessors control and direct the execution of the instructions or portions of software code of the program or programs for implementing the method, described below.

With reference to FIGS. 4 to 9, a description will now be given of the method of allocating computer resources, that is to say nodes 5 of a predetermined processing zone 2 of the cluster 1 for the execution of at least one task T submitted to the cluster 1.

Figure 4:
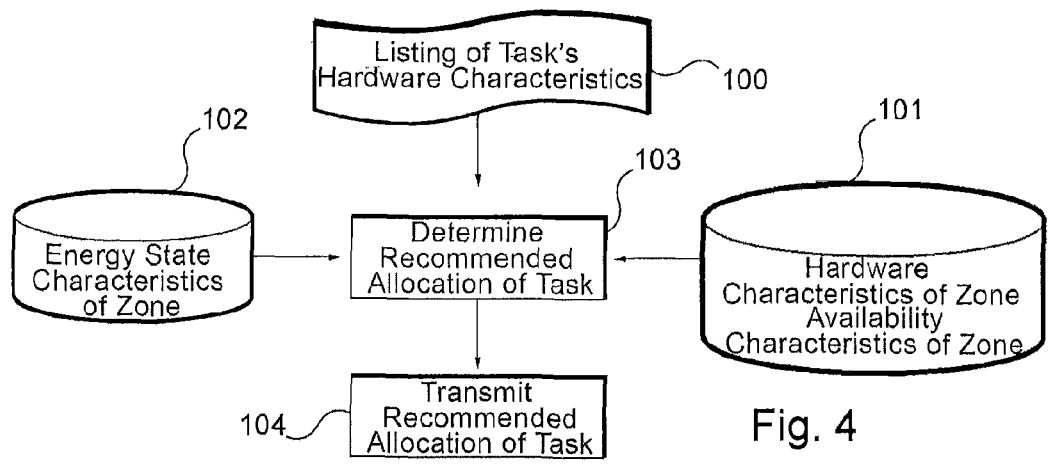
FIG. 4 is a block diagram illustrating different operating steps of the method.

FIG. 4 is a block diagram of an embodiment of the steps enabling the determination by the correlation system 9 of the placement of at least one task T submitted to the task manager 7.

At step 100, the correlation system 9 receives a file listing the hardware characteristics of at least one task T. It is seen below with reference to FIG. 6 what the hardware characteristics can be.

Figure 6:
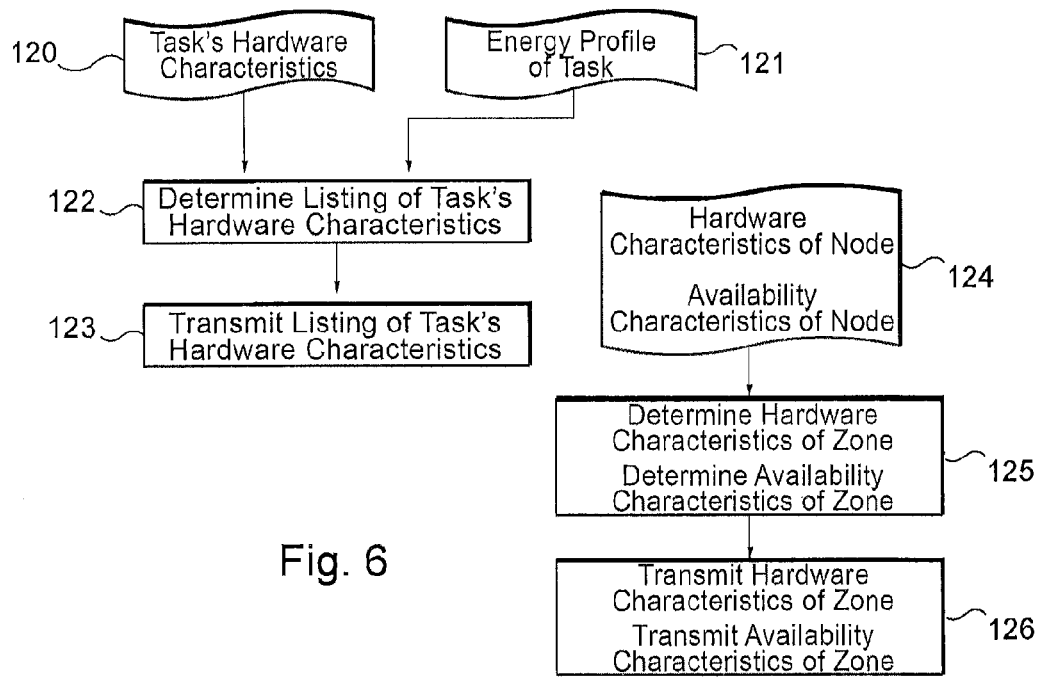

At step 101 the correlation system 9 furthermore receives a database grouping together the hardware characteristics of the computer resources, that is to say of the nodes 5, of a predetermined processing zone 2 as well as the availability characteristics of the nodes 5 of that processing zone 2. With reference also to FIG. 6, it is seen below what the hardware characteristics of the nodes 5 of that zone 2 can correspond to.

In certain embodiments, the predetermined processing zone 2 can correspond to several nodes 5 of the cluster 1.

At step 102, the correlation system 9 also receives a database grouping together the energy state characteristics of the nodes 5 of the predetermined processing zone 2. It is seen below what information those energy state characteristics can correspond to with reference to FIG. 5.

It is noted that the file received by the correlation system 9 at step 100 may group together the hardware characteristics of several tasks T submitted to the cluster 1 and received by the task manager 7.

Furthermore, it is noted that the databases received by the correlation system 9 at steps 101 and 102 may group together the hardware, availability and energy state characteristics, not only of the predetermined processing zone, but also of other processing zones of the cluster 1, or even of the entirety of the cluster 1.

It is furthermore noted that the database received by the correlation system at step 102 in fact comes from another part of that same correlation system 9 since it is the latter which determines that database in advance in that other part.

Next at step 103 the correlation system 9 can determine a recommended placement for the task T or the tasks T listed in the file received at step 100 on the basis of predetermined rules loaded in advance via a file provided with those rules in the general device for monitoring and control 6 to be taken into account in the correlation system 9.

This determining step 103 can be carried out by correlation of the hardware characteristics of the task or tasks T and of the hardware, availability and energy state characteristics of the nodes 5 at least of the predetermined processing zone 2.

The predetermined rules for correlation of the aforementioned characteristics which concern the tasks T and the nodes 5 of at least the predetermined processing zone 2 and for placement of those tasks T take into consideration the energy impact on the nodes 5 of the predetermined processing zone 2, or even of the entirety of the cluster 1, linked to the execution of at least one task T among those tasks T. Below is seen an example of a set of predetermined rules for correlation and placement.

Thus, step 103 of determining a recommended placement for at least one task T from among the tasks T can comprise the step of determining the energy impact linked to the execution of that task T from among the tasks T on the basis of hardware characteristics of said task T that are received at step 100 and the energy state characteristics of the nodes 5 at least of the predetermined processing zone 2, or even of the entirety of the cluster 1, received at step 102.

At that same step 103, the correlation system 9 can next deduce a recommended list of allocations of the nodes 5 of the predetermined processing zone 2 for the execution of at least a task T from among the tasks T in the cluster 1. In certain embodiments, the correlation system 9 thus can generate a file establishing a recommended list of allocations of the nodes 5 for the execution of the task or tasks T and at step 104 can transmit (or send) that file to the task manager 7 for the execution of the task or tasks T by the nodes 5, whether or not they are recommended, by the predetermined processing zone 2.

FIG. 8 is a block diagram of an embodiment of the steps enabling the sending of the choice of allocations of the nodes 5 of the predetermined processing zone 2 by the task manager 7 to that same zone 2.

At step 140 the task manager 7 receives the file provided with the recommended list of allocations of the nodes 5 of the predetermined processing zone 2 for the execution of one or more tasks T.

At step 141 the task manager 7 can next determine the definitive allocation of the nodes 5 of the predetermined processing zone 2 or of another processing zone of the cluster 1 for the execution of one or more of the tasks T.

This determining step 141 can be carried out according to dominant criteria such that a weight (in other words a priority or an importance) may for example be placed on the execution priority given to the tasks T or on the predetermined correlation rules implemented by the correlation system 9.

In other words, the rules of the task manager 7 can make it possible to define whether a user of the cluster 1 gives precedence to energy saving or submission speed of the task or tasks T.

It may be that no additional weight is given to these two criteria.

At step 142 the task manager 7 can transmit (or send) the file corresponding to the definitive choice of allocations of the task or tasks T to the computer resources, that is to say to the nodes 5, of the predetermined processing zone 2 of the cluster 1, or of another processing zone according to the choice made by the task manager 7.

It is noted that mention is made here of definitive choice at step 141 but it may be that this choice will be modified according to information received by the task manager 7, for example if the correlation system 9 sends a new file listing the recommended applications. As a matter of fact, the correlation system 9 can continuously receive information (steps 100, 101 and 102), that is to say dynamically, and thus determines a recommended allocation list (step 103) also dynamically and can thus be capable of sending such files listing the recommended allocations (step 104) also dynamically.

FIG. 9 is a block diagram of an embodiment of the steps enabling the execution of the task T or of the tasks T by the nodes 5 of the cluster 1.

At step 150, the nodes 5 of the cluster 1 which are allocated for the execution of the task T receive the file listing the definitive allocation choices for those nodes 5 for the execution of at least one task T.

At step 151, each node 5, or only each part of node 5 or else each group of nodes 5 can execute the task T to which that node has been allocated.

FIG. 6 shows a block diagram of an embodiment of the steps enabling the determination of the list of the hardware characteristics of the task or tasks T submitted to the task manager 7.

At step 120 the task manager 7 receives a file of hardware characteristics of the task or tasks T submitted to it.

At step 121 the task manager 7 furthermore receives a file presenting an energy profile of each of the tasks T submitted to it.

It is noted that the hardware characteristics of each task T can correspond to the number of basic computation units necessary for the execution of that task T, and/or a memory size necessary for the execution of the task T and/or to an execution priority of that task T.

It is furthermore observed that an energy profile may be associated with each task T submitted to the task manager 7.

The energy profile of a task T can be in fact a prior analysis of the energy impact of that task T with a precise identification of needs in particular in terms of power requirement. In other words, it is the electrical power consumed by the node or nodes 5 which might execute that task T at the time of its execution, and/or in terms of heat loss from the node or nodes 5 which might execute that task T at the time of its execution, in other words the temperature rise of that node or nodes 5.

An energy profile of a task T is for example expressed by characteristics of frequency of use of the processors 52 of a node 5 and/or percentage of bandwidth use of the memory of that node 5 and/or of the inputs/outputs.

At step 122 the task manager 7 then can determine a file listing the task or tasks T submitted to it and for each task T, the hardware characteristics of that task T associated with the energy profile of the latter.

In other words, at this step 122, the task manager can determine a list of the hardware characteristics of the task or tasks T which are submitted to it according to the number of basic computation units and/or the memory size necessary for the execution of that task or those tasks T and/or the execution priority of those tasks T and/or the energy profile of that or those tasks T.

At step 123 the task manager 7 then can transmit (or send) the file listing the hardware characteristics of at least one task T (submitted to that task manager 7) towards the correlation system 9 (which receives it at the step 100 which can be seen in FIG. 4).

FIG. 7 shows a block diagram of an embodiment of the steps enabling the determination of the hardware characteristics of the nodes 5 at least of the predetermined processing zone 2 of the cluster 1 and of the availability characteristics of those nodes 5.

At step 134 the cluster 1 can determine the hardware characteristics of each node 5 that it comprises.

In other words, these hardware characteristics can correspond to the number of basic computation units and/or to a memory size of each node 5.

At step 135, the cluster 1 can transmit (or send) a file generated at step 134 provided with hardware characteristics of the nodes 5 at least of the predetermined processing zone 2 of the cluster 1, or even of the entirety of the cluster 1, to the task manager 7.

Also at step 136, the cluster 1 can determine the availability characteristics of each node 5 at least of the processing zone 2 of the cluster 1, or even of the entirety of the cluster 1.

At a given time, these availability characteristics can correspond to the frequency at which the microprocessors are running and/or to the percentage of bandwidth use of the memory and/or of the inputs/outputs of those nodes 5.

At step 137, the cluster 1 can furthermore transmit (or send) a file of the availability characteristics of the nodes 5 at least of the predetermined processing zone 2 of the cluster 1, or even of the entirety of the cluster 1, which file was generated beforehand at step 136. This file can be sent by the cluster 1 to the task manager 7.

FIG. 6 furthermore shows a block diagram of an embodiment of the steps enabling determination of the hardware and availability characteristics of the predetermined processing zone 2, or even of the entirety of the cluster 1.

At step 124, the task manager 7 receives a file grouping together the files generated at steps 134 and 136 by the cluster 1, in other words a file grouping together the hardware and availability characteristics of each node 5 at least of the predetermined processing zone 2, or even of the entirety of the cluster 1.

At step 125, the task manager 7 can determine the hardware and availability characteristics at least of the predetermined processing zone 2, or even of the entirety of the cluster 1, based on the characteristics associated with the nodes 5 received with the file at step 124.

These hardware and availability characteristics are similar to those corresponding to each node 5 apart from the fact that they henceforth concern sets of nodes 5, in other words a zone, or even a set of zones, or even the entirety of the cluster 1.

At that same step 125 the task manager 7 can generate a database grouping together the hardware and availability characteristics at least of the predetermined processing zone 2, or even of the entirety of the cluster 1, and can transmit (or send) that database at step 126 to the correlation system 9 (the latter receives that database at step 120 which can be seen in FIG. 4).

FIG. 7 furthermore shows the block diagrams of an embodiment of the steps enabling determination of the heat loss characteristics and the determination of the electricity consumption characteristics of the nodes 5 of at least the predetermined processing zone 2, or even of the entirety of the cluster 1.

At step 130 the cluster 1 can determine the heat loss characteristics of each of those nodes 5, corresponding particularly to the predetermined processing zone 2, or even to the entirety of the cluster 1.

At that same step 130 the cluster 1 can generate a file of heat loss characteristics of the nodes 5 at least of the predetermined processing zone 2, or even of the entirety of the cluster 1, then can transmit (or send) that file at step 131 to the correlation system 9.

At step 132 the cluster 1 furthermore can determine the electricity consumption characteristics of each of the nodes 5 of the cluster 1, in particular of the nodes 5 of the predetermined processing zone 2, or even of the entirety of the cluster 1.

At that same step 132 the cluster 1 furthermore can generate a file of electricity consumption characteristics of the nodes 5 at least of the predetermined processing zone 2, or even of the entirety of the cluster 1, then can transmit (or send) that file at step 133 to the correlation system 9.

Figure 5:
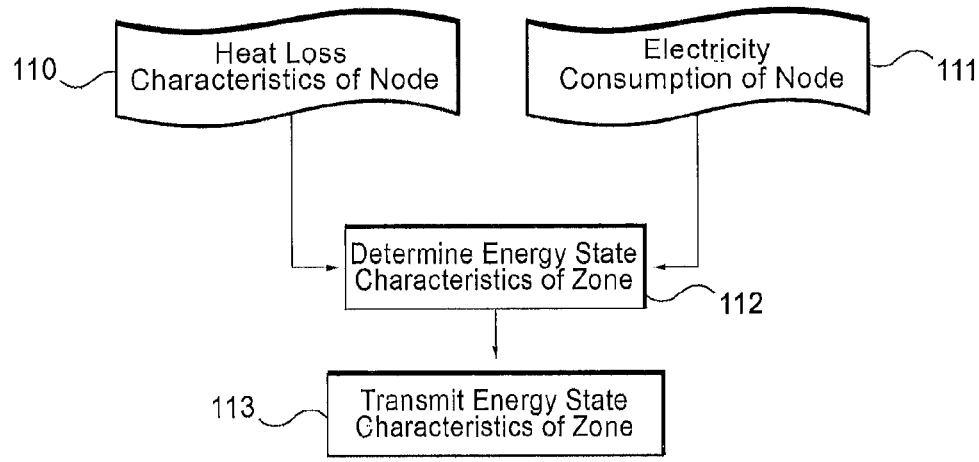
FIGS. 5 and 6 are block diagrams respectively illustrating establishing a database of energy state characteristics of at least one processing zone and establishing a file of hardware characteristics of at least one submitted task as well as a database of hardware and availability characteristics of the at least one zone, for the implementation of the operating steps that can be seen in FIG. 4.

FIG. 5 is a block diagram of an embodiment of the steps enabling determination of the energy characteristics of the predetermined processing zone 2, or even of the entirety of the cluster 1.

It is noted that the energy state characteristics can correspond to the heat loss and/or to the electricity consumption, in other words to the electrical power consumed, of the nodes 5 at least of the predetermined processing zone 2, or even of the cluster 1.

At steps 110 and 111, the correlation system 9 also receives respectively a file of the heat loss characteristics of the nodes 5 at least of the predetermined processing zone 2, or even of the entirety of the cluster 1, and a file of electricity consumption of the nodes 5 at least of the predetermined processing zone 2, or even of the entirety of the cluster 1.

At step 112 the correlation system 9 can determine the energy state characteristics at least of the predetermined processing zone 2, or even of the entirety of the cluster 1, according to the characteristics of the files received at steps 110 and 111.

At that same step 112 the correlation system 9 furthermore can generate a database grouping together the energy state characteristics at least of the predetermined processing zone 2, or even of the entirety of the cluster 1, then at step 113 can transmit (or send) that database to another part of that correlation system 9, which at step 102 (FIG. 4) receives that database which that correlation system 9 uses as a basis among others to determine the recommended placement of the task or tasks T at step 103.

The method of allocating the nodes 5 of at least one predetermined processing zone 2 of the cluster 1 for the execution of at least one task T submitted to that cluster 1, in particular to its task manager 7, makes it possible to improve the energy impact of the entirety of the cluster 1 by in particular reducing the electrical power consumed by that cluster 1. This is particularly important in the context of clusters and data centers which, with the aforementioned earlier allocation methods, may consume very high electrical power.

To be precise, taking into account the electricity consumption of the entirety of the cluster 1, by taking into account each predetermined processing zone 2, or even each node 5, makes it possible to optimize the placement of the task or tasks T based on that electricity consumption criterion.

It is noted that also taking into account a criterion linked to the heat loss of the entirety of the cluster 1, or at the very least of each predetermined processing zone 2, or even of each node 5, makes it possible to further optimize the placement of the task or tasks T.

This is because taking into account that heat criterion is directly linked with the electricity consumption, since a node 5 that has a maximum electrical power consumed may generate a rise in temperature by itself, and the resulting heat loss risks affecting the surrounding nodes.

A description will now be given of a concrete but non-limiting example.

The task manager 7 receives a task T having a certain number of hardware characteristics as well as an energy profile.

The hardware characteristics of that task T are defined by a need for two hundred and fifty-six cores, with 4 Gb of memory per core as well as a maximum execution priority.

The energy profile of this task T defines an energy need requiring the microprocessors 52 of the nodes 5 that will have to execute that task T to operate at full speed, that is to say that they have maximum frequency, and require the full bandwidth use of the memory and of the inputs/outputs, which means a maximum energy consumption per node 5.

In this example, the predetermined processing zone 2 is provided with four racks 3 which each have fifty-four nodes respectively numbered No. 0 to No. 53 for the first rack, No. 54 to No. 107 for the second rack, No. 108 to No. 162 for the third rack and No. 163 to No. 217 for the fourth rack.

Only the nodes No. 54 to No. 162 are nodes having 4 Gb per core and having sixteen cores per node, the other nodes not having these hardware characteristics.

The nodes No. 54 to No. 162 are also nodes that are available for the execution of the task T.

Determination has thus been made here of the file listing the hardware characteristics of the task T and the database grouping together the hardware and availability characteristics of the processing zone 2.

In the example, it will be assumed that the instantaneous consumption of the cluster 1, and in particular of the predetermined processing zone 2, is the following:

the first rack 3 which comprises the nodes No. 0 to No. 53 has a maximum energy consumption over its three levels (upper, central and lower);

the second rack 3 having nodes No. 54 to No. 107 has a minimum energy consumption on its upper level and on its lower level and a medium energy consumption on its central level.

the third rack 3 having nodes No. 108 to No. 162 has a medium energy consumption over its three levels; and the fourth rack 3 having nodes No. 163 to No. 217 has a medium energy consumption on its upper level and on its central level and a minimum energy consumption on its lower level.

It is also assumed that the instantaneous heat loss of the cluster 1, and in particular of the predetermined processing zone 2, is the following:

the first rack 3 having nodes No. 0 to No. 53 has a maximum heat loss over its three levels;

the second rack 3 having nodes No. 54 to No. 107 has a medium heat loss on its upper level and on its lower level and a maximum heat loss on its central level; and the third and fourth racks 3 having respectively nodes No. 108 to No. 162 and No. 163 to No. 217 each have an medium heat loss over its three levels.

This information relative to the energy state of the nodes 5 of the predetermined processing zone 2 makes it possible to establish the database of the energy characteristics of the predetermined processing zone 2, or even of the entirety of the cluster 1.

In the example described here, it will also be assumed that the classification policy for the tasks T, that is to say the predetermined rules which are loaded into the correlation system 9, is based on the correlation between the current energy consumption (in other words prior to the execution of the task T), the current energy loss and the risk of extending the heat loss zone, that is to say that the nodes 5 with medium or minimum heat loss are impacted by the adjacent nodes 5 with maximum heat loss and thus lead to an increase in the temperature of the nodes 5 with medium or minimum heat loss and thus an increase in their own heat loss.

The correlation system 9 can then determine a file of recommended allocations of the nodes 5 for the execution of the task T.

It has been seen that the nodes No. 54 to No. 162 are potentially nodes able to execute the task T and thus that these nodes can potentially be allocated to that task T.

It has also been seen that the nodes No. 54 to No. 107 are more exposed in terms of energy consumption (in other words in electricity consumption) than the nodes No. 108 to No. 162.

Given that the needs (energy profile of the task T) are first of all those of the nodes with maximum power (for example having a maximum microprocessor frequency) and that the placement policy (that is to say the predetermined rules of the correlation system 9) is to limit the impact on the nodes 5 having a normal or minimum heat loss, it is not therefore judicious to take the nodes No. 108 to No. 162 given their geographical position. This is because the increase in the temperature of nodes No. 108 to No. 162 would directly impact the adjacent nodes No. 54 to No. 107 and No. 163 to No. 217.

The recommended selection of the nodes 5 for the execution of the task T is thus judiciously chosen from among the nodes No. 54 to No. 107.

It has been seen that among these nodes No. 54 to No. 107, nodes No. 72 to No. 90 corresponding to the central level of the second rack 3 have maximum heat loss.

It is thus more judicious to use nodes No. 54 to No. 71 and/or nodes No. 91 to No. 107 corresponding respectively to the upper and lower level of the second rack 3 rather than nodes No. 72 to No. 90.

Knowing that, geographically, nodes No. 54 to No. 71 are at the top of the second rack 3 (upper level), it will be assumed that precedence will be given to their use since heat dissipates more easily upwards.

As regards the blades 4 of electronic components, in the structure of that second rack 3, there are two levels and it will be assumed that it is preferred to take the blades situated at the top of the structure instead of those situated at the bottom of the structure. As a variant, it can be preferred to take an opposite rule or give precedence to continuity in the numbering of the nodes 5.

Thus, the correlation system 9 can recommend allocating the nodes No. 54, No. 56, No. 58, No. 60, No. 64, No. 66, No. 68 and No. 70 situated on the upper level of the second rack 3, then the nodes No. 55, No. 57, No. 59, No. 61, No. 62, No. 63, No. 65, and No. 67 following that same upper level of that same rack 3.

Lastly, the correlation system 9 can recommend the allocation of the nodes No. 54 to No. 68 and No. 70 for the execution of the task T.

In the described example, no weight is attributed to the priority of execution of the task T and/or to the energy criterion, in other words to the energy impact of that task T.

In variants that are not illustrated:

the predetermined processing zone does not correspond to a zone such as can be seen in FIG. 1 but rather can correspond to a complete row of racks 3, or even to a single rack 3, or even to part of a rack 3, or even to a single blade 4 electronic components, or even to a single node 5, or even to a single part of a node 5, or even to the entirety of the cluster 1;

a node may be formed solely of certain electronic components of an item of computer equipment, or even on the contrary to several items of computer equipment;

the predetermined rules loaded into the correlation system 9 can be different from the rules taken in the described example;

each task T submitted to the task manager 7 can be provided with an energy profile, or on the contrary only some tasks are associated with a respective energy profile or a further possibility can be that no task has an energy profile.

the architecture of the node illustrated in FIG. 3 can be different, for example it has a larger or smaller amount of volatile memory, more or fewer microprocessors;

the step of determining energy state characteristics of the nodes at least of the predetermined processing zone can be carried out only according to the heat loss characteristics of those nodes or only according to the electricity consumption characteristics of those nodes;

the step of determining energy state characteristics of the nodes at least of the predetermined processing zone is not carried out by the correlation system 9 but rather by the energy manager 8; and/or the data which pass between the energy manager, the correlation system, the task manager and the processing zones are not integrated into files or databases, but more generally pass via a network, at least for some of them, it being possible for example for the others to be stored in the files or databases or even to be stored in memory before sending.

It should be noted more generally that the application is not limited to the examples described and represented.

The invention claimed is:

1. A method of dynamically allocating computer resources of a cluster to optimize the execution of at least one task in response to the at least one task being submitted to the cluster for processing, the dynamic allocation of computer resources of the cluster being collectively controlled by a task manager module, an energy manager module, and a correlation system module, the method comprising:

upon submission of the at least one task, receiving, by the correlation system module, hardware characteristics of the at least one submitted task transmitted by the task manager module regarding a number of basic computation units and/or a memory size necessary for the execution of the at least one submitted task and/or execution priority of the at least one submitted task;

receiving, by the correlation system module, hardware and availability characteristics, transmitted by the task manager module, of computer resources of at least one processing zone of the cluster;

receiving, by the correlation system module, energy state characteristics, transmitted by the energy manager module, of the computer resources of the at least one processing zone of the cluster;

dynamically determining, by the correlation system module, a recommended placement of the at least one submitted task by correlating the hardware characteristics of the at least one submitted task, the hardware and availability characteristics of the computer resources of the at least one processing zone of the cluster, and the energy state characteristics of the computer resources of the at least one processing zone of the cluster, against monitoring and control rules, wherein the monitoring and control rules are user-configurable at least with respect to both an energy constraint parameter and a submission speed parameter to indicate where precedence with respect to the energy constraint parameter and the submission speed parameter is given in allocating resources for the at least one submitted task;

dynamically deriving, by the correlation system module, a recommended allocation list of the computer resources of the at least one processing zone of the cluster for the execution of the at least one submitted task in the cluster, based on the recommended placement of the at least one submitted task; and transmitting, by the correlation system module, the recommended allocation list of the computer resources for the execution of the at least one submitted task in the cluster to the task manager module for optimal processing.

2. The method according to claim 1, further comprising the task manager module determining allocation of the computer resources of the at least one processing zone of the cluster for optimal processing of the at least one submitted task based, in part, on the recommended allocation list transmitted by the correlation system module.

3. The method according to claim 1, wherein the energy state characteristics of the computer resources of the at least one processing zone of the cluster correspond to heat loss and/or electricity consumption of the computer resources of the cluster, and wherein the method further comprises determining heat loss characteristics at least of the computer resources of the at least one processing zone of the cluster and/or determining electricity consumption characteristics at least of the computer resources of the at least one processing zone of the cluster.

4. The method according to claim 3, further comprising determining the energy state characteristics of the computer resources of the at least one processing zone of the cluster on the basis of the heat loss characteristics and/or of the electricity consumption characteristics of at least of the computer resources of the at least one processing zone of the cluster.

5. The method according to claim 1, wherein the monitoring and control rules of correlation and of placement take into consideration energy impact on the computer resources of the cluster for the execution of the at least one submitted task, and wherein dynamically determining the recommended placement of the at least one submitted task comprises determining the energy impact linked to the execution of the at least one submitted task on the basis of the hardware characteristics of the at least one submitted task and of the energy state characteristics of the computer resources of the at least one processing zone of the cluster.

6. The method according to claim 1, wherein the hardware and availability characteristics of the computer resources of the at least one processing zone of the cluster correspond to a number of basic computation units and/or to a memory size of the computer resources of the at least one processing zone of the cluster, and wherein the method further comprises determining the hardware characteristics of the computer resources of the at least one processing zone of the cluster and determining the availability characteristics of the computer resources of the at least one processing zone of the cluster.

7. The method according to claim 1, further comprising determining a list of the hardware characteristics of the at least one submitted task according to the number of basic computation units and/or the memory size necessary for the execution of the at least one submitted task and/or the execution priority of the at least one submitted task.

8. The method according to claim 1, further comprising receiving an energy profile associated with the at least one submitted task, and determining a list of the hardware characteristics of the at least one submitted task based on the energy profile associated with the at least one submitted task.

9. A non-transitory computer program product encoded with instructions adapted for directing a computer or a processor to carry out the method according to claim 1 when the non-transitory computer program product is executed on the computer or the processor.

10. A device comprising a processor and a memory storage, the processor configured to operate and control the task manager module, the energy manager module, and the correlation system module to carry out the method of claim 1.

11. The device according to claim 10, wherein the task manager module and the energy manager module each communicate independently with the computer resources of the cluster, and wherein the correlation system module communicates both with the task manager module and with the energy manager module.

12. The method according to claim 1, wherein the at least one processing zone of the cluster includes a plurality of basic computation units.

13. The method according to claim 12, wherein the availability characteristics of the computer resources of the at least one processing zone of the cluster correspond to a frequency at which the respective basic computation units are operating and to a percentage use of memory of the at least one processing zone of the cluster and/or of inputs/outputs of the plurality of basic computation units.

14. The method according to claim 1, further comprising adding or replacing the computer resources of the cluster based on the precedence being given to the submission speed parameter.

15. The method according to claim 14, wherein the addition or replacement of the computer resources of the cluster comprises adjusting a number of microprocessors, a number of cores, a total memory size, a size of volatile memory, a size of hard disk memory, or a maximum frequency of use of the microprocessors.

16. The method according to claim 1, wherein the hardware characteristics of the computer resources of the at least one processing zone of the cluster include a maximum frequency of use of each of the respective basic computation units of the at least one processing zone of the cluster.

* * * * *

UNITED STATES PATENT AND TRADEMARK OFFICE
CERTIFICATE OF CORRECTION

| | | |
|---|---|---|
| PATENT NO. | : 9,880,887 B2 | Page 1 of 1 |
| APPLICATION NO. | : 14/356874 | |
| DATED | : January 30, 2018 | |
| INVENTOR(S) | : Jean-Olivier Gerphagnon et al. | |

It is certified that error appears in the above-identified patent and that said Letters Patent is hereby corrected as shown below:

On the Title Page

Item (73) Assignee:
Please correct the Assignee's residence/mailing city as follows:
BULL SAS, Les Clayes Sous Bois (FR)

Signed and Sealed this
Tenth Day of April, 2018

Andrei Iancu
*Director of the United States Patent and Trademark Office*